United States Patent
Song

(10) Patent No.: US 11,586,817 B2
(45) Date of Patent: Feb. 21, 2023

(54) WORD VECTOR RETROFITTING METHOD AND APPARATUS

(71) Applicant: TENCENT TECHNOLOGY (SHENZHEN) COMPANY LIMITED, Shenzhen (CN)

(72) Inventor: Yan Song, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 325 days.

(21) Appl. No.: 16/892,240

(22) Filed: Jun. 3, 2020

(65) Prior Publication Data

US 2020/0293722 A1    Sep. 17, 2020

Related U.S. Application Data

(63) Continuation of application No. PCT/CN2019/074769, filed on Feb. 11, 2019.

(30) Foreign Application Priority Data

Feb. 12, 2018 (CN) .......................... 201810144166.9

(51) Int. Cl.
G06F 40/00        (2020.01)
G06F 40/274      (2020.01)
(Continued)

(52) U.S. Cl.
CPC ............ G06F 40/274 (2020.01); G06F 40/20 (2020.01); G06F 40/45 (2020.01); G06F 40/49 (2020.01);
(Continued)

(58) Field of Classification Search
CPC ........ G06F 40/274; G06F 40/20; G06F 40/45; G06F 40/49; G06F 17/2775;
(Continued)

(56) References Cited

U.S. PATENT DOCUMENTS

2017/0092264 A1*  3/2017  Hakkani-Tur .......... G10L 15/22
2018/0350065 A1* 12/2018  Nakano ................ G06V 10/454

FOREIGN PATENT DOCUMENTS

CN    102326144 A  *  1/2012  ......... G06F 16/3326
CN    104765769 A      7/2015
(Continued)

OTHER PUBLICATIONS

Rong, X. (2014). word2vec parameter learning explained. arXiv preprint arXiv:1411.2738. (Year: 2014).*
(Continued)

*Primary Examiner* — Edgar X Guerra-Erazo
*Assistant Examiner* — Philip H Lam
(74) *Attorney, Agent, or Firm* — Anova Law Group PLLC

(57) ABSTRACT

The present disclosure discloses a word vector retrofitting method. The method includes obtaining, by a computing device, a first model and a second model that are generated when original word vectors are trained, the first model being configured to predict a context according to an inputted word, and the second model being configured to predict a target word according to a context; inputting a corpus unit from a target corpus into the first model, inputting an output of the first model into the second model, and determining losses generated by the first model and the second model when the second model outputs the corpus unit; and retrofitting the first model and the second model according to the losses.

18 Claims, 7 Drawing Sheets

(51) Int. Cl.
  *G06F 40/45*  (2020.01)
  *G06F 40/49*  (2020.01)
  *G06K 9/62*   (2022.01)
  *G06F 40/20*  (2020.01)
(52) U.S. Cl.
  CPC ......... *G06K 9/6257* (2013.01); *G06K 9/6262* (2013.01)
(58) Field of Classification Search
  CPC ........... G06F 17/2795; G06F 17/30705; G06F 40/00; G06F 17/00; G06K 9/6257; G06K 9/6262; G06K 9/6271; G06K 9/00; G06N 3/08
  See application file for complete search history.

(56) References Cited

FOREIGN PATENT DOCUMENTS

| | | | | |
|---|---|---|---|---|
| CN | 104965819 | A | | 10/2015 |
| CN | 105894088 | A | | 8/2016 |
| CN | 106407393 | A * | 2/2017 | ........... G06F 16/635 |
| CN | 107239529 | A | | 10/2017 |
| CN | 107273355 | A * | 10/2017 | ........... G06F 40/284 |
| CN | 105393263 | B * | 1/2018 | ........... G06F 16/951 |
| CN | 107608953 | A | | 1/2018 |
| EP | 2775108 | A2 * | 9/2014 | ............. F01K 13/02 |
| JP | 5378171 | B2 * | 12/2013 | ......... G06F 17/5018 |
| WO | WO-2015183699 | A1 * | 12/2015 | ......... G06F 16/3329 |

OTHER PUBLICATIONS

Jianqiang Li, Jing Li, Xianghua Fu, M.A. Masud, Joshua Zhexue Huang,Learning distributed word representation with multi-contextual mixed embedding,Knowledge-Based Systems, vol. 106,2016,pp. 220-230,ISSN 0950-7051 https://doi.org/10.1016/j.knosys.2016.05.045. (Year: 2016).*

The World Intellectual Property Organization (WIPO) International Search Report for PCT/CN2019/074769 dated May 9, 2019 5 Pages (including translation).

T. Mikolov et al., "Linguistic Regularities in Continuous Space Word Representations," In Proceedings of NAACL-HLT, 2013, pp. 746-751. 6 Pages.

T. Mikolov et al., "Distributed Representations of Words and Phrases and their Compositionality," In NIPS, 2013, pp. 3111-3119 9 Pages.

J. Pennington et al., "Glove: Global Vectors for Word Representation," In Proceedings of EMNLP, 2014, pp. 1532-1543. 12 Pages.

D.M. Blei et al., "Latent Dirichlet Allocation," Journal of Machine Learning Research 3, 2003, pp. 993-1022. 30 Pages.

P. Resnick et al., "GroupLens: An Open Architecture for Collaborative Filtering of Netnews," Computer Supported Cooperative Work, pp. 175-186. Chapel Hill, North Carolina 12 Pages.

M. Faruqui et al., "Retrofitting Word Vectors to Semantic Lexicons," In Proceedings of NAACL-HLT, 2015, pp. 1606-1615. 10 Pages.

M. Yu et al., 2014. "Improving lexical embeddings with semantic knowledge," In Proceedings of ACL, 2014, pp. 545-550. 6 Pages.

D. Kiela et al., "Specializing word embeddings for similarity or relatedness," In Proceedings of EMNLP, 2015, pp. 2044-2048. 5 Pages.

Y. Song et al., "Embedding Projection for Query Understanding," In Proceedings of WWW. 2017, pp. 839-840. Perth, Australia. 2 Pages.

R. Collobert et al., "Natural Language Processing (Almost) from Scratch," Journal of Machine Learning Research 12, 2011, pp. 2493-2537. 45 Pages.

* cited by examiner

WORD VECTOR RETROFITTING METHOD AND APPARATUS

RELATED APPLICATIONS

This application claims priority to PCT Application No. PCT/CN2019/074769, filed on Feb. 11, 2019, which claims priority of Chinese Patent Application No. 201810144166.9, filed on Feb. 12, 2018 with the China National Intellectual Property Administration, and entitled "WORD VECTOR RETROFITTING METHOD AND APPARATUS." The two applications are incorporated by reference in their entirety.

FIELD OF THE TECHNOLOGY

The present disclosure relates to the field of computer application technologies, and in particular, to a word vector retrofitting method and apparatus, a computer-readable storage medium, and an electronic device.

BACKGROUND OF THE DISCLOSURE

With continuous development of computer application technologies, natural language processing is increasingly widely used. The requirements of various applications, such as applications using machine translation, speech recognition, and information retrieval, pose increasingly high demands on natural language processing capabilities of computers.

At present, when a natural language task is processed, a distributed representation is a commonly used text representation method. In this method, all words in natural language are mapped into fixed-length vectors through training, and all the vectors are placed together to form a word vector space. Each vector is a point in the space, and then the word vector is directly used to replace the word to represent text, thereby transforming the understanding of natural language into a mathematical problem of machine learning.

To obtain word vectors that can be used for subsequent machine processing based on natural language training, a variety of training models that focus on different processing scenarios have been provided in the related art, such as a context-to-word Continuous Bag-of-words, (CB) model that is more suitable for text classification, and a word-to-context skip-gram (SG) model that is more suitable for sequence labeling. However, none of the models supports incremental training. Once the word vectors obtained through training need to be adjusted, it is often necessary to reconstruct a large-scale corpus and train the word vectors from scratch, resulting in additional computational burden.

In addition to training of word vectors, retrofitting of word vectors is also a key technology to effectively improve the performance of word vectors. A common word vector retrofitting process is usually directed to given word vectors that are pre-trained, where the word vectors are adjusted under the guide of manually labeled or automatically extracted word-to-word relationships, thereby upgrading original low-quality word vectors to high-quality word vectors. However, such a retrofitting method is only suitable for a small quantity of words, and is useless for words without labeled data.

The existing word vector training models and retrofitting methods cannot improve quality of word vectors by directly using any external information, nor resolve the domain migration problem of adjusting old word vectors for use in a new usage environment.

SUMMARY

To resolve the technical problems in the related art, for example, quality improvement and cross-domain use of word vectors cannot be achieved through incremental training, the present disclosure provides a word vector retrofitting method and apparatus, a computer-readable storage medium, and an electronic device.

According to an embodiment of the present disclosure, a word vector retrofitting method is provided. The method includes obtaining, by a computing device, a first model and a second model that are generated when original word vectors are trained, the first model being configured to predict a context according to an inputted word, and the second model being configured to predict a target word according to a context; inputting a corpus unit from a target corpus into the first model, inputting an output of the first model into the second model, and determining losses generated by the first model and the second model when the second model outputs the corpus unit; and retrofitting the first model and the second model according to the losses.

According to an embodiment of the present disclosure, a word vector retrofitting method is provided. The method includes obtaining, by a computing device, a first model and a second model that have opposite training directions; inputting a to-be-trained target corpus into the first model, inputting an output of the first model into the second model, and obtaining losses generated by the first model and the second model respectively when the second model outputs the target corpus; and retrofitting the first model and the second model according to the losses.

According to an embodiment of the present disclosure, an electronic device is provided. The electronic device includes a processor; and a memory, the memory storing a computer-readable instructions, the computer-readable instruction, when executed by the processor, implementing the word vector retrofitting method, comprising: obtaining, by a computing device, a first model and a second model that are generated when original word vectors are trained, the first model being configured to predict a context according to an inputted word, and the second model being configured to predict a target word according to a context; inputting a corpus unit from a target corpus into the first model, inputting an output of the first model into the second model, and determining losses generated by the first model and the second model when the second model outputs the corpus unit; and retrofitting the first model and the second model according to the losses.

Based on the word vector retrofitting methods provided in the foregoing embodiments, the corpus unit from the target corpus is set to be the input of the first model and the output of the second model by using the characteristic that the first model and the second model have opposite training directions. By obtaining the losses generated by the first model and the second model, during the process of training all corpus units of the target corpus, the parameters of the first model and the second model are continuously retrofitted based on the foregoing losses, so that the training of retrofitting both the first model and the second model is implemented based on only the target corpus.

It is to be understood that the above general descriptions and the following detailed descriptions are merely exemplary, and do not limit the present disclosure.

BRIEF DESCRIPTION OF THE DRAWINGS

The accompanying drawings herein, incorporated in the specification as a part of the specification, show embodiments in accordance with the present disclosure, and are used to explain, together with the specification, the principle of the present disclosure.

DESCRIPTION OF EMBODIMENTS

Figure 1:
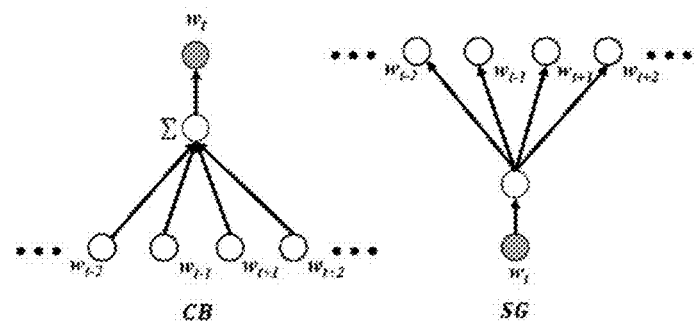
FIG. 1 shows schematic training processes of a CB model and an SG model.

Exemplary implementations are described comprehensively with reference to the accompanying drawings in this part. However, the exemplary implementations may be implemented in multiple forms, and are not to be understood as being limited to the examples described herein. Conversely, the implementations are provided to make the present disclosure more comprehensive and complete, and comprehensively convey the idea of the exemplary implementations to a person skilled in the art.

In addition, the described features, structures or characteristics may be combined in one or more embodiments in any appropriate manner. In the following descriptions, a lot of specific details are provided to give a comprehensive understanding of the embodiments of the present disclosure. However, a person skilled in the art is to be aware that, the technical solutions in the present disclosure may be implemented without one or more of particular details, or another method, component, apparatus, or step may be used. In other cases, well-known methods, apparatuses, implementations, or operations are not shown or described in detail, to avoid obscuring aspects of the present disclosure.

The block diagram shown in the accompanying drawings is merely a functional entity and does not necessarily correspond to a physically independent entity. That is, the functional entities can be implemented in the form of software, or implemented in one or more hardware modules or integrated circuits, or implemented in different networks and/or processor apparatuses and/or microcontroller apparatuses.

The flowchart shown in the accompanying drawings is merely exemplary description, and does not necessarily include all contents and operations/steps, nor does it have to be executed in the order described. For example, some operations/steps may be further divided, and some operations/steps may be combined or partially combined, so that the order of actual execution may change according to actual situations.

Before exemplary embodiments of the present disclosure are described in detail, the following first briefly introduces a few principles that are helpful for understanding the present disclosure.

Word to vector (Word2Vec) is a technology of a distributed representation of words. That is, all words in a corpus are projected onto a semantic space having specific dimensionality, each word can be simply represented as a point on a multi-dimensional space, and spatial dimensionality can be customized, and is usually set to 100 to 200 dimensions (the default dimensionality of Word2Vec is 100 dimensions). Larger dimensionality indicates more complex training. After being trained, a word may be represented as a vector like {0.159, −0.234, 0.789, −0.578, −0.501, 0.921, 0.374, . . . }. It is intuitively understood that, in the Word2Vec technology, semantically similar words are projected into a multi-dimensional space through model means, so that similar words are located at neighboring positions in a high-dimensional space.

A CB model and an SG model are two currently popular word vector learning frameworks in the Word2Vec technology, and can both be considered as a language model using a neural network. FIG. 1 shows schematic training processes of a CB model and an SG model. In short, the CB model uses a context environment ( . . . $w_{t-2}$, $w_{t-1}$, $w_{t+1}$, $w_{t+2}$, . . . ) to predict a target word $w_t$; conversely, the SG model uses an input word $w_t$ to predict a surrounding context ( . . . $w_{t-2}$, $w_{t-1}$, $w_{t+1}$, $w_{t+2}$, . . . ). It can be seen from FIG. 1 that, prediction directions of the two models are opposite, so that the two models also have different perspectives of learning word vectors. The CB model focuses more on impact of a text block, as a whole, on a word, and is closer to a conventional N-gram grammar language model. The SG model cares more about a relationship between words in a specific text segment. Therefore, the word vectors obtained through training by using the two models have different performance in different natural language processing tasks. For example, the CB model works better in text classification tasks, and the SG model is more suitable for sequence labeling tasks.

In addition to the CB model and the SG model that are based on the Word2Vec technology, there is also a word vector model GloVe based on co-occurrence matrix. In short, the GloVe model directly calculates a co-occurrence relationship between words in a document (or long-distance context), then expresses this relationship as a word-to-word association matrix, finally obtains a row correlation matrix and a column correlation matrix of all words through matrix factorization, and then takes a row (column) vector of a specific length as a word vector. In addition, a topic model for constructing words that is similar to GloVe or a high-density expressions obtained by using a method of associating words with other signals (for example, collaborative filtering) can be considered as expression forms of the word vector.

The CB, SG, GloVe, and topic models mentioned above and the like are all modeled based on word co-occurrence or relation mapping, and therefore, are limited by training of a single corpus and require large-scale data to acquire reliable word vectors. In addition, none of the foregoing models supports incremental training. As a result, once the acquired word vectors need to be adjusted, it is often necessary to reconstruct a large-scale corpus and train the word vectors from scratch. Therefore, the foregoing models are not efficient in terms of resource utilization, and often bring an additional computational burden in an industrial environment. As mentioned in the Background of the Disclosure, the word vector retrofitting method can resolve this problem to some extent. However, a conventional retrofitting method often requires reliable manually labeled or automatically extracted word-to-word relationships as a guide to effectively retrofit word vectors; otherwise, quality of the original word vectors may be weakened. In addition, the retrofitting method often works on only a small quantity of words, and is useless for words other than labeled data.

With the wide application of natural language processing, the domain migration problem will be faced in more and more scenarios. For example, original word vectors are obtained through training in a general domain or a single domain (such as news), but a usage environment is often in another field with insufficient data (such as medical care). When word vectors trained in an original domain are used in a new domain, the original word vectors cannot reflect the characteristics of the new domain due to insufficient data, and such a case may be referred to as a cold start of the word vectors. Under such a cold-start condition, none of the foregoing word vector training models and retrofitting methods can effectively perform incremental learning of word vectors for a target domain. In addition, none of the foregoing word vector training models and retrofitting methods can directly use any external information to help the learning of vectors. That is, except for dependency relationships of words, other signals cannot be used as a reference for improving quality of vectors.

To resolve the foregoing problems, the embodiments of the present disclosure provide a word vector retrofitting method and apparatus based on reinforcement learning, a computer-readable storage medium, and an electronic device.

In connectionism approaches of machine learning, supervised leaning is a machine learning task that infers a function from labeled training data; correspondingly, unsupervised learning is to attempt to find hidden structures in unlabeled data, to seek for, summarize, and explain characteristics of data. If the foregoing CB, SG, GloVe and other word vector learning models are defined as unsupervised learning, the conventional retrofitting model may often be considered as supervised learning.

In addition, reinforcement learning refers to learning, by an intelligent system, of a mapping from an environment to a behavior, to maximize a function value of a reward signal (reinforcement signal). A principle of the reinforcement learning is that if a specific behavior policy of an object agent interacting with an environment results in a positive reward (reinforcement signal) from the environment, the agent's tendency to generate this behavior policy will be strengthened in the future. Unlike supervised learning, in reinforcement learning, the agent is not told, by using labels, how to generate a correct action, but a reinforcement signal provided by the environment is used as an evaluation of quality of an action generated by the agent, and further, the agent acquires knowledge in the environment where actions are evaluated one by one, to improve an action scheme to adapt to the environment.

In the embodiments of the present disclosure, the reinforcement learning method is used for the first time in the field of word vector learning, where two acquired models with different training directions are defined as two different agents, and retrofitting and learning of model parameters are implemented through interaction between the two agents.

Implementation details of the technical solutions of the embodiments of the present disclosure are described below in detail.

Figure 2:
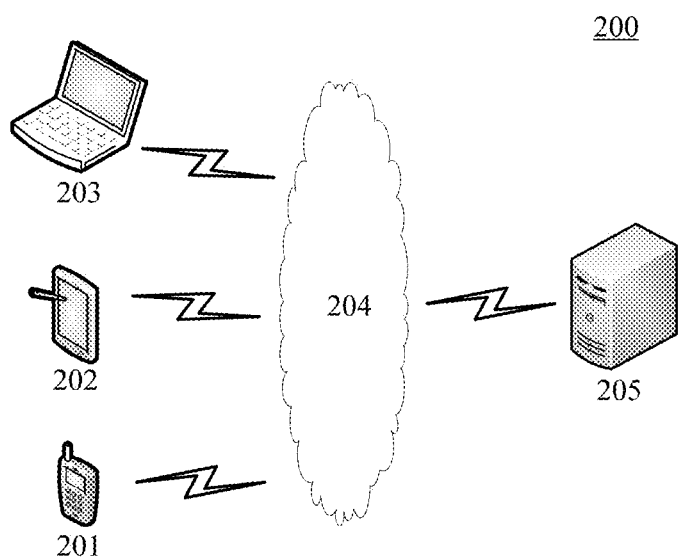
FIG. 2 shows a schematic diagram of an exemplary system architecture to which a word vector retrofitting method or a word vector retrofitting apparatus according to an embodiment of the present disclosure is applicable.

FIG. 2 shows a schematic diagram of an exemplary system architecture 200 to which a word vector retrofitting method or a word vector retrofitting apparatus of an embodiment of the present disclosure is applicable.

As shown in FIG. 2, the system architecture 200 may include one or more of terminal devices 201, 202, and 203, a network 204, and a server 205. The network 204 is a medium configured to provide a communication link between the terminal devices 201, 202, and 203 and the server 205. The network 204 may include various connection types such as wired or wireless communication links, or optical fiber cables.

It is to be understood that quantities of terminal devices, networks, and servers in FIG. 2 are merely exemplary. According to implementation requirements, there may be any quantity of terminal devices, networks and servers. For example, the server 205 may be a server cluster that includes a plurality of servers.

A user may use the terminal devices 201, 202, and 203 to interact with the server 205 through the network 204 to receive or send messages and the like. The terminal devices 201, 202, and 203 may be various electronic devices having display screens, including, but not limited to, smart phones, tablet computers, portable computers, and desktop computers.

The server 205 may be a server that provides various services. For example, a user uploads original word vectors and a to-be-processed target corpus to the server 205 by using the terminal device 203 (which may alternatively be terminal device 201 or 202). The server 205 may obtain a first model and a second model generated when training the original word vectors, then input corpus units from the target corpus one by one into the first model, input the output of the first model into the second model, to implement concatenation of the first model and the second model, and then obtain losses generated by the first model and the second model when the second model is caused to output corresponding corpus units, thereby retrofitting the first model and the second model according to the losses.

For example, the server 205 may obtain a first model and a second model that are generated when original word vectors are trained, the first model being configured to predict a context according to an inputted word, and the second model being configured to predict a target word according to a context; input a corpus unit from a target corpus into the first model, input the output of the first model into the second model, and obtain losses generated by the first model and the second model when the second model outputs the corpus unit; and retrofit the first model and the second model according to the losses. In the present disclosure, the term "when," as used in when the original word vectors are trained and other instances in the disclosure, may refer to one or more results produced before, during, or after a training process without any specific limitations on the time of the training or the time at which the result or results are generated. The term "when" may be used to indicate correlation or causation in these instances.

For another example, the server 205 may alternatively obtain a first model and a second model that have opposite training directions; input a to-be-trained target corpus into the first model, input the output of the first model into the second model, and obtain losses generated by the first model and the second model respectively when the second model outputs the target corpus; and retrofit the first model and the second model according to the losses.

In some embodiments, the word vector retrofitting method provided in the embodiments of the present disclosure is usually performed by the server 205, and accordingly, the word vector retrofitting apparatus is usually disposed in the server 205. In some other embodiments, some terminals may have similar functions as the server and perform the method. Therefore, the word vector retrofitting method provided in the embodiments of the present disclosure is not strictly limited to execution on the server side.

The embodiments of the present disclosure may be implemented as an electronic device, including a processor and a memory, the memory storing a computer-readable instruction, the computer-readable instruction, when executed by the processor, implementing the word vector retrofitting method described in any embodiment of the present disclosure. For example, steps shown in FIG. 4 to FIG. 6 may be implemented.

Figure 3:
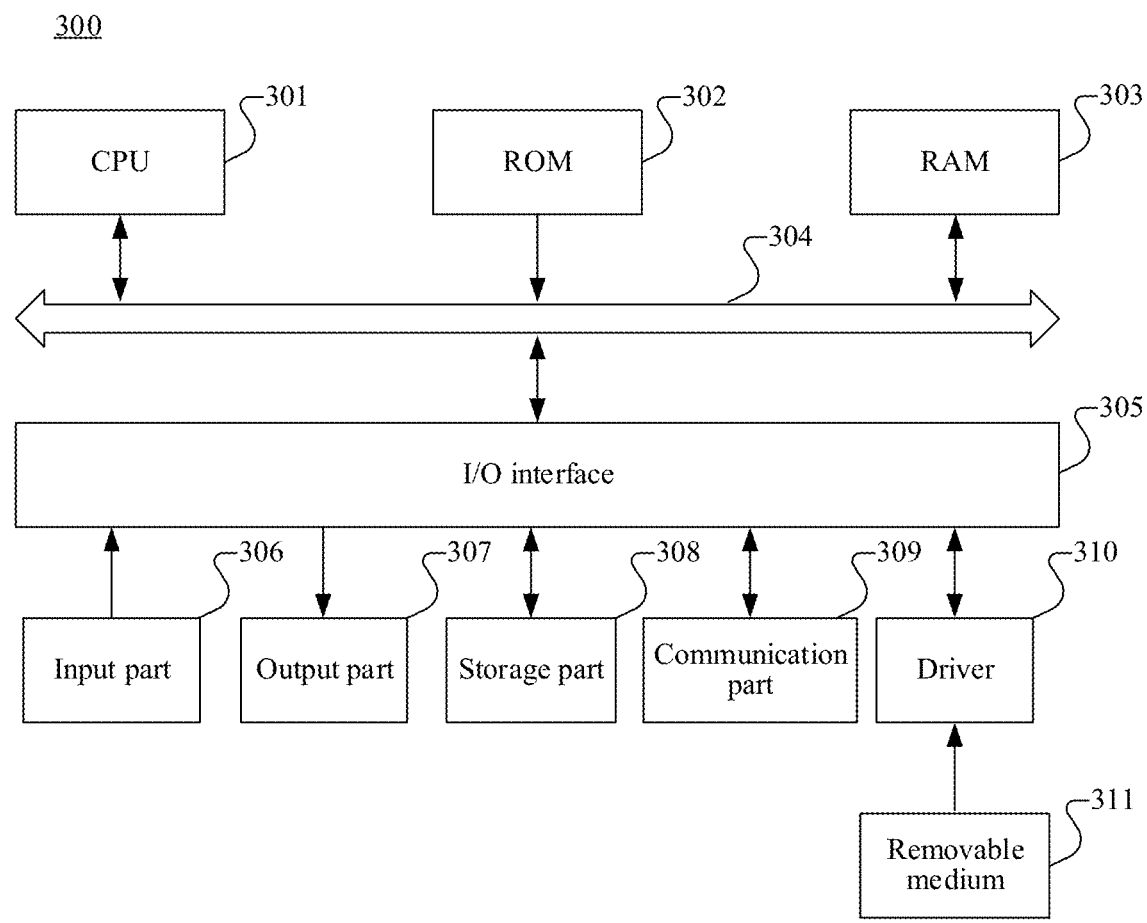
FIG. 3 shows a schematic structural diagram of a computer system suitable for implementing an electronic device according to an embodiment of the present disclosure.

FIG. 3 shows a schematic structural diagram of a computer system suitable for implementing an electronic device according to an embodiment of the present disclosure.

A computer system 300 of the electronic device shown in FIG. 3 is only an example, and is not to impose any limitation on functions and a use scope of the embodiments of the present disclosure.

As shown in FIG. 3, the computer system 300 includes a central processing unit (CPU) 301, capable of performing various proper actions and processing based on a program stored in a read-only memory (ROM) 302 or a program loaded from a storage part 308 into a random access memory (RAM) 303. The RAM 303 also stores various programs and data required for system operations. The CPU 301, the ROM 302, and the RAM 303 are connected to each other through a bus 304. An input/output (I/O) interface 305 is also connected to the bus 304.

The following parts are connected to the I/O interface 305: an input part 306 including a keyboard, a mouse, or the like; an output part 307 including a cathode ray tube (CRT), a liquid crystal display (LCD), or the like, and a speaker or the like; a storage part 308 including a hard disk; and a communication part 309 including a network interface card such as a LAN card or a modem. The communication part 309 performs communication processing by using a network such as the Internet. A driver 310 is also connected to the I/O interface 305 as required. A removable medium 311, such as a magnetic disk, an optical disc, a magneto-optical disk, or a semiconductor memory, is mounted on the driver 310 as required, so that a computer program read from the removable medium 311 is installed into the storage part 308 as required.

Particularly, according to an embodiment of the present disclosure, the processes described in the following by referring to the flowcharts may be implemented as computer software programs. For example, an embodiment of the present disclosure includes a computer program product, and the computer program product includes a computer program stored in a computer-readable medium. The computer program includes program code used for performing the methods shown in the flowcharts. In such an embodiment, by using the communication part 309, the computer program may be downloaded and installed from a network, and/or installed from the removable medium 311. When the computer program is executed by the central processing unit (CPU) 301, various functions defined in the embodiments of the present disclosure are executed.

The computer-readable medium in the present disclosure may be a computer-readable signal medium or a computer-readable storage medium or any combination thereof. The computer-readable storage medium may be, for example, but not limited to, an electric, magnetic, optical, electro- magnetic, infrared, or semi-conductive system, apparatus, or device, or any combination thereof. More specific examples of the computer-readable storage medium may include but are not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof. In the present disclosure, the computer-readable storage medium may be any tangible medium including or storing a program, and the program may be used by or in combination with an instruction execution system, apparatus, or device. In the present disclosure, the computer-readable signal medium may include a data signal propagated in a baseband or as part of a carrier, and stores computer-readable program code. The data signal may be propagated in a plurality of forms, including, but not limited to, an electromagnetic signal, an optical signal, or any appropriate combination thereof. The computer-readable signal medium may alternatively be any computer-readable medium other than the computer-readable storage medium. The computer-readable medium may be configured to send, propagate, or transmit a program configured to be used by or in combination with an instruction execution system, apparatus, or device. The program code included in the computer-readable medium may be transmitted by using any suitable medium, including but not limited to, wireless transmission, a wire, a cable, and radio frequency (RF), or any suitable combination of thereof.

According to another aspect, the present application further provides a computer-readable medium. The computer-readable medium may be included in the electronic device described in the foregoing embodiments, or may exist alone and is not assembled in the electronic device. The foregoing computer-readable medium carries one or more programs. When the one or more programs are executed by one electronic device, the electronic device is caused to implement the methods described in the following embodiments. For example, the electronic device may implement the steps shown in FIG. 4 to FIG. 6.

Figure 4:
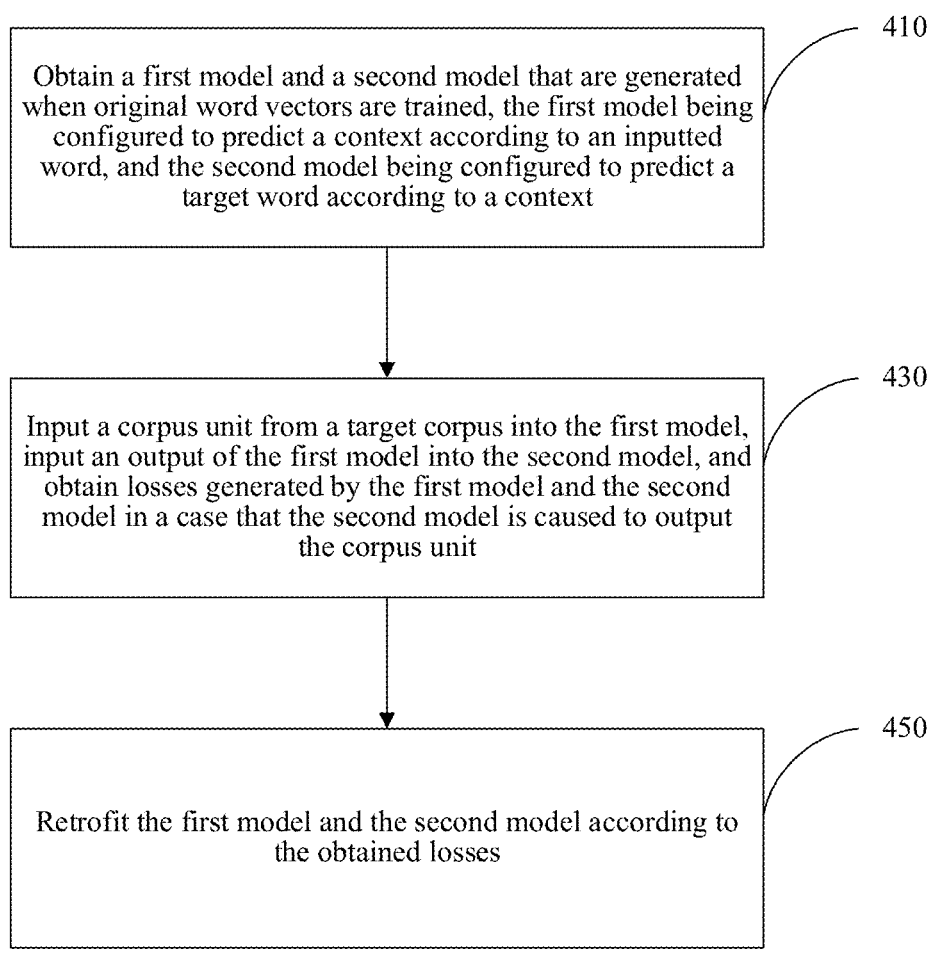
FIG. 4 is a flowchart of a word vector retrofitting method according to an exemplary embodiment.

FIG. 4 is a flowchart of a word vector retrofitting method according to an exemplary embodiment. As shown in FIG. 4, the word vector retrofitting method may be performed by any computing device, and may include the following steps 410 to 450.

Step 410: A computing device obtains a first model and a second model that are generated when original word vectors are trained, the first model being configured to predict a context according to an inputted word, and the second model being configured to predict a target word according to a context.

As described above, the common CB, SG, GloVe and other word vector training models cannot implement incremental training by themselves. In the embodiments of the present disclosure, retrofitting and learning of model parameters are implemented through interaction between two acquired models with different training directions.

In one embodiment, the first model and the second model may be learned without supervision by using a large-scale training corpus, where the first model is configured to predict a context according to an inputted word, and the second model is configured to predict a target word according to a context.

In another embodiment, in step 410, open-source word vectors, for example, Google's word vectors of a 300- dimensional news corpus (googlenews-vectors-negative300.bin) pre-trained by using a Word2Vec tool, may also be directly obtained and used as an input for subsequent retrofitting steps.

The foregoing first model may be, for example, the SG model, and the second model may be, for example, the CB model. The embodiments of the present disclosure are not limited thereto.

In step 430, the computing device inputs a corpus unit from a target corpus into the first model, inputs an output of the first model into the second model, and obtains losses generated by the first model and the second model when the second model outputs the corpus unit.

In the embodiments of the present disclosure, the corpus unit from the target corpus is set as an input of the first model, and an output of the first model is used as an input of the second model, to implement concatenation of the first model and the second model. In this way, because neither the first model nor the second model is initially trained by using the target corpus, impact of the target corpus on the models cannot be reflected. In the foregoing process in which the corpus unit goes through the first model and the second model that are in concatenation, and the corpus unit is finally outputted, a loss (error) is inevitably generated. In this embodiment, the characteristic that the first model and the second model have opposite training directions is used, and the losses generated by the first model and the second model are obtained, so that during the process of training all corpus units of the target corpus, parameters of the first model and the second model can be continuously retrofitted based on the foregoing losses.

Using an example in which the first model and the second model provide corresponding probabilities for an outputted corpus, in the first model in which a context is predicted according to an inputted word, the foregoing loss may, for example, be represented as that for a corpus unit from the target corpus, a probability of outputting a context of the corpus unit through the first model is very low; similarly, in the second model in which a target word is predicted according to a context, the foregoing loss may, for example, be represented as that for a context of the foregoing corpus unit in the target corpus, a probability of outputting the corpus unit through the second model is also very low. Relatively speaking, in a case in which only the first model or only the second model is set, the target corpus needs to be added to a corpus for training original word vectors, and the retrofitted first model or second model can be obtained through training from scratch based on the entire retrofitted corpus.

Step 450: The computing device retrofits the first model and the second model according to the obtained losses.

In the embodiments of the present disclosure, the reinforcement learning method is used, the first model and the second model with different training directions are defined as two different agents, and retrofitting and learning of model parameters are implemented through interaction between the two agents. Step 430: Concatenate the first model and the second model, and use an output of the first model as an input of the second model, thereby implementing information exchange between the two agents. Then, the corpus unit from the target corpus is inputted into the first model, and the second model is caused to output the foregoing corpus unit (that is, an input of the first model), and losses generated in the two models in this process are calculated, so that the first model and the second model can be retrofitted based on the losses in step 450. For a specific execution process of step 450, refer to FIG. 5 and a related description.

In one embodiment, the losses of the first model and the second model may be directly calculated in step 430, and then the losses are used as a reference for retrofitting the two models in step 450.

In one embodiment, a preset intermediate variable may be introduced. The intermediate variable is added to the context of the foregoing corpus unit to train the second model, a first loss when the first model outputs the context and the intermediate variable is obtained, and a second loss when the foregoing corpus unit is outputted through the second model according to the context and the intermediate variable is obtained, so that a combined loss of the two models is obtained based on the first loss and the second loss.

In one embodiment, the preset intermediate variable may be an intermediate word having the highest output probability when the foregoing corpus unit is inputted into the first model. The intermediate word is added to the context of the foregoing corpus unit to train the second model. A first loss when the first model outputs the context and the intermediate word is obtained, and a second loss when the foregoing corpus unit is outputted through the second model according to the context and the intermediate word is obtained, so that a combined loss of the two models is obtained based on the first loss and the second loss. For example, for the first model that is not trained by using the target corpus, when the corpus unit from the target corpus is input, an intermediate word having the highest output probability will come from a corpus for training original word vectors (hereinafter also referred to as a source corpus), and a probability of outputting a context of the corpus unit in the target corpus will be very small. To enable the first model to reflect the characteristics of the target corpus, a training direction of the first model is to make an output probability of the intermediate word equal to an average output probability of the context of the foregoing corpus unit, so that a first loss can be obtained based on a difference between the foregoing two output probabilities (that is, the output probability of the intermediate word and the average output probability of the context of the corpus unit). Similarly, for the second model that is not trained by using the target corpus, when the intermediate word from the source corpus is added to the foregoing context, an output probability of the foregoing corpus unit is very small. To enable the second model to reflect the characteristics of the target corpus, a training direction of the second model is to make the output probability of the foregoing corpus unit close to 1 (because the corpus unit appears together with the foregoing context in the target corpus), so that a second loss can be obtained based on the output probability of the foregoing corpus unit.

In another embodiment, the foregoing preset intermediate variable may also include other types of corpus units, for example, non-text or non-word corpus signals, including text classification information and sentiment tag information.

In one embodiment, after step 450, steps 410 to 450 are repeated on the entire target corpus. That is, all corpus units from the target corpus are sequentially used as inputs in step 430 and subjected to the calculation in step 450, to obtain the first model and the second model of which parameters are retrofitted (refer to steps 510 to 550 for details).

In this case, the target corpus and the source corpus may be the same or different, and may both come from the same domain or come from different domains. In one embodiment, the target corpus may be the same as the source corpus, and quality of original word vectors can be improved through retrofitting of models based on the target corpus (equivalent to reinforcement training). In one embodiment, the target corpus may be a part of the source corpus. Through selective setting of the target corpus and the retrofitting of models based on the target corpus, the retrofitted word vectors can be more inclined to reflect the characteristics of the target corpus. In one embodiment, the target corpus and the source corpus may come from completely different domains. In this way, through the retrofitting of the models based on the target corpus, the retrofitted word vectors can reflect the characteristics of the target corpus, which is equivalent to implementing migration and use of the word vectors.

In the embodiments of the present disclosure, the corpus unit from the target corpus is set to be an input of the first model by using the characteristic that the first model and the second model have opposite training directions, and an output of the first model is used as an input of the second model, to implement concatenation of the first model and the second model. Then, by obtaining the losses generated by the first model and the second model, during the process of training all corpus units of the target corpus, the parameters of the first model and the second model are continuously retrofitted based on the foregoing losses, so that retrofitting and training can be performed on both the first model and the second model based on only the target corpus.

Based on the word vector retrofitting method provided in the foregoing embodiments, incremental training of word vectors can be implemented, to avoid training the word vectors from scratch based on a large-scale training corpus, so that computing resources can be effectively saved. When the target corpus comes from a new domain, the retrofitted word vectors can adapt to the characteristics of the target corpus through training, thereby implementing migration and use of word vectors. This is more suitable for cold-start application scenarios.

Figure 5:
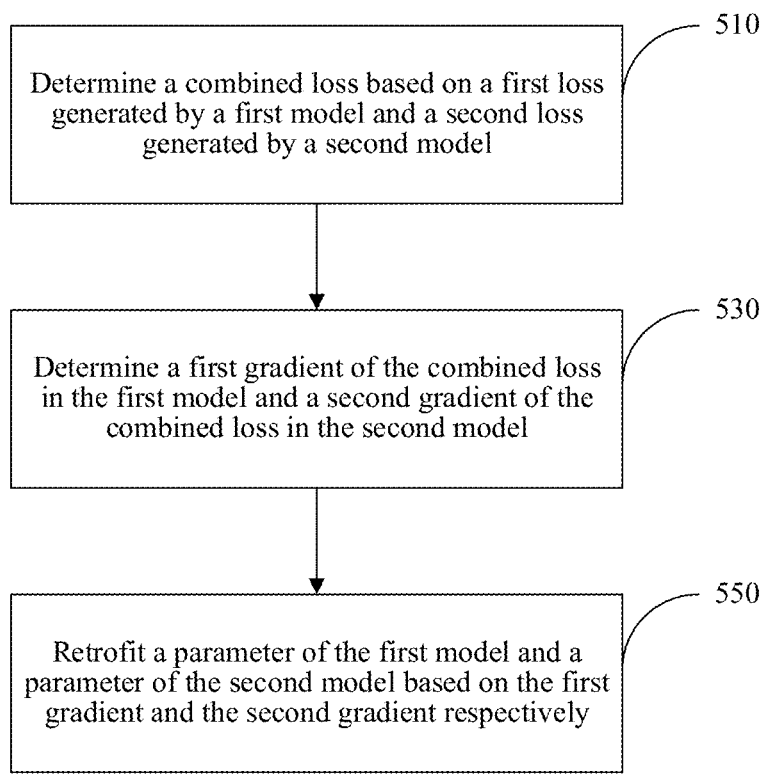
FIG. 5 is a flowchart of step 450 shown in FIG. 4 according to an exemplary embodiment.

FIG. 5 is a flowchart of step 450 shown in FIG. 4 according to an exemplary embodiment. As shown in FIG. 5, the process may be performed by any computing device, and may include the following steps 510 to 550.

Step 510: A computing device determines a combined loss based on the first loss generated by the first model and the second loss generated by the second model.

To gradually synchronize performance of the two models, losses generated by the two models respectively may be combined and then used as a basis for subsequent model retrofitting. In one embodiment, the combined loss is calculated through weighted summing of the first loss and the second loss. Weight coefficients assigned to the first loss and the second loss may be set to fixed values, for example, both are 0.5.

Step 530: The computing device determines a first gradient of the combined loss in the first model and a second gradient of the combined loss in the second model.

Step 550: The computing device retrofits a parameter of the first model and a parameter of the second model based on the first gradient and the second gradient respectively.

After the combined loss of a concatenation model of the first model and the second model in a case in which the corpus unit of the target corpus is used as an input and an output is obtained in step 510, model parameters may be retrofitted based on a standard policy gradient method. A gradient matrix of the combined loss in the first model and a gradient matrix of the combined loss in the second model are obtained respectively in step 530, so that parameter matrices of the first model and the second model are adjusted based on the gradient matrices respectively in step 550, and the retrofitted first model and second model can be obtained.

In one embodiment, step 550 includes: retrofitting, by the computing device, the parameter of the first model based on the first gradient and a first weight corresponding to the first gradient; and retrofitting the parameter of the second model based on the second gradient and a second weight corresponding to the second gradient. The first weight and the second weight herein are decreasing weights in the policy gradient method, and values of the two weights decrease in accordance with the training process, for example, decrease from 0.025.

In one embodiment, the parameters of the first model and the second model may alternatively be iteratively retrofitted with reference to the expectation maximization (EM) algorithm in step 550, and performance of the two models is gradually synchronized, to improve performance of each model. An exemplary process of the EM algorithm herein may include, for example: first keeping the parameter of the first model unchanged, and retrofitting the parameter of the second model based on the second gradient by using a standard policy gradient; and then keeping the parameter of the retrofitted second model unchanged, and retrofitting the parameter of the first model based on the first gradient by using the standard policy gradient. In this way, the parameters of the two models that finally meet a convergence condition or a quantity of iterations are obtained through iteration.

Figure 6:
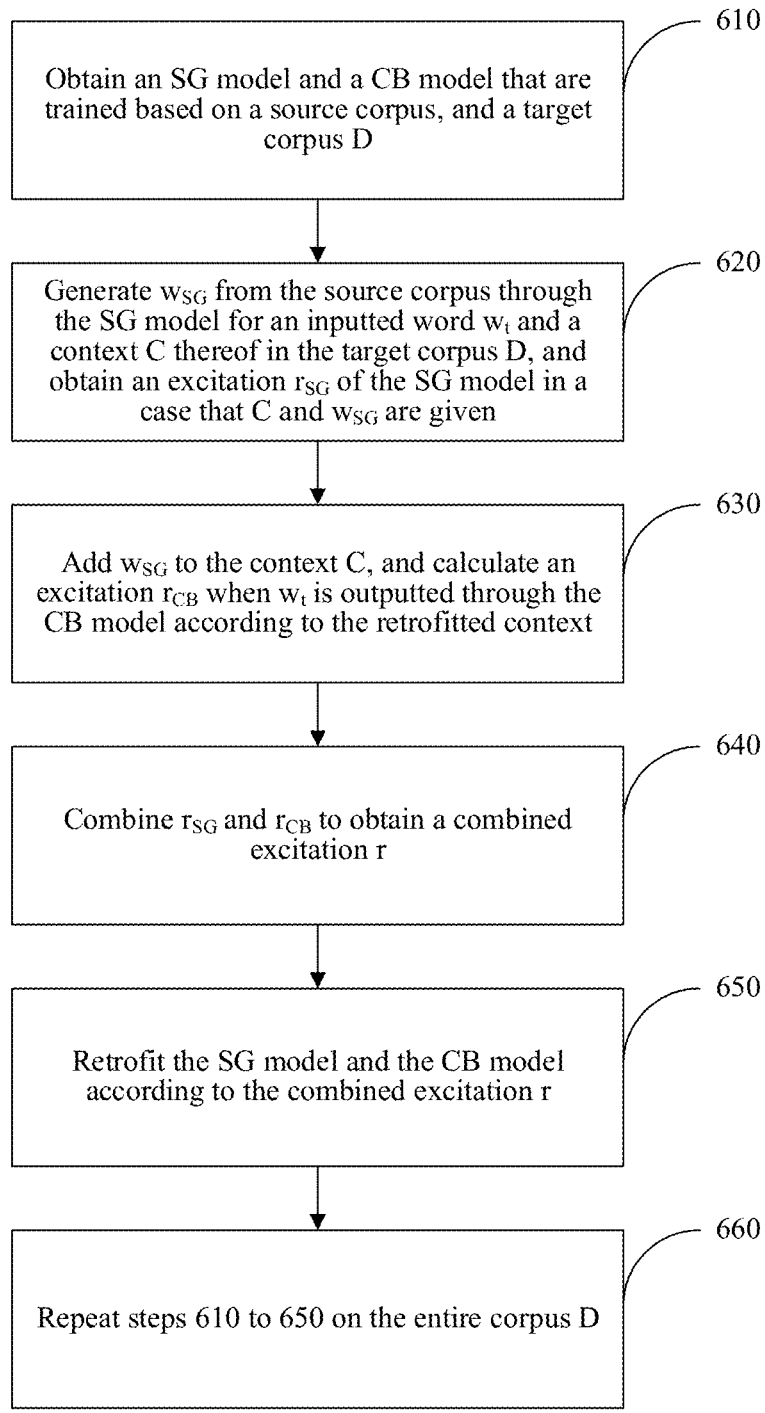
FIG. 6 is a flowchart of a word vector retrofitting method according to another exemplary embodiment.
Figure 7:
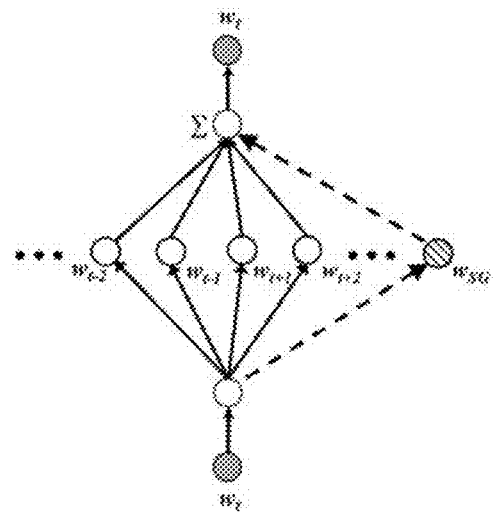
FIG. 7 shows a schematic training process of the embodiment shown in FIG. 6.

FIG. 6 is a flowchart of a word vector retrofitting method according to another exemplary embodiment, and FIG. 7 shows a schematic training process of the embodiment shown in FIG. 6. As shown in FIG. 6, the word vector retrofitting method may be performed by any computing device, and may include the following steps 610 to 660.

Step 610: A computing device obtains an SG model and a CB model that are trained based on a source corpus, and a target corpus D.

Step 620: The computing device generates $w_{SG}$ from the source corpus through the SG model for an inputted word $w_t$, and a context C thereof in the target corpus D that is given, and obtains an excitation $r_{SG}$ of the SG model when C and $w_{SG}$ are given:

$$r_{SG} = \frac{1}{|C|} \sum_{w_j \in C} \log p(w_j \mid w_t; \Theta_{SG}) - \log p(w_{SG} \mid w_t; \Theta_{SG}) \quad (1)$$

where |C| represents a size of a context, that is, a quantity of words included in C; $w_j$ represents each word in the context C; $\Theta_{SG}$ represents a parameter of the SG model; $p(w_j|w_t; \Theta_{SG})$ represents a probability that the current SG model outputs each word $w_j$ when the inputted word $w_t$ is given; and $p(w_{SG}|w_t; \Theta_{SG})$ represents a probability that the current SG model outputs $w_{SG}$ when the inputted word $w_t$ is given. Therefore, the excitation $r_{SG}$ obtained by using the formula (1) can represent a similarity between $w_{SG}$ and C in the SG model.

In an initial stage of the retrofitting, since the SG model is not trained by using the target corpus D, an average probability that the SG module outputs the context C in the target corpus D is much less than a probability that the SG module outputs $w_{SG}$ in the source corpus, so that a result of the formula (1) is obviously less than zero. As the process of model retrofitting continues, the SG model is trained by using the target corpus D, and its average probability of outputting the context C in the target corpus D tends to be close to the probability of outputting $w_{SG}$ in the source corpus, so that a result of the formula (1) also approaches zero, indicating that $w_{SG}$ in the retrofitted SG model tends to be close to C, thereby enabling the retrofitted SG model to reflect the characteristics of the target corpus.

Step 630: The computing device adds $w_{SG}$ to the context C, and calculates an excitation $r_{CB}$ when $w_t$ is outputted through the CB model according to the retrofitted context:

$$r_{CB} = \log p(w_t | C + w_{SG}; \Theta_{CB}) \quad (2)$$

where $C + w_{SG}$ represents a new context formed after $w_{SG}$ is added to C, and $p(w_t | C + w_{SG}; \Theta_{CB})$ represents a probability that a current CB model outputs $w_t$ when the new context is inputted.

In the initial stage of the retrofitting, since the CB model is not trained by using the target corpus D, after the context C from the target corpus and $w_{SG}$ from the source corpus are inputted into the CB model, a probability that the CB module outputs $w_t$ is much less than 1, so that a result of the formula (2) is also obviously less than zero. As the process of model retrofitting continues, the CB model is trained by using the target corpus D, the context C from the target corpus and $w_{SG}$ from the source corpus are inputted into the CB model, and the probability that the CB model outputs $w_t$ also approaches 1, so that a result of the formula (2) also approaches zero, thereby enabling the retrofitted CB model to reflect the characteristics of the target corpus.

In this embodiment, the excitation $r_{SG}$ represents the first loss generated based on the first model, and the excitation $r_{CB}$ represents the second loss generated based on the second model.

Step 640: The computing device combines $r_{SG}$ and $r_{CB}$ to obtain a combined excitation r:

$$r = \lambda r_{SG} + (1-\lambda) r_{CB} \quad (3)$$

where λ is a weight coefficient, and indicates which model is expected to better reflect the characteristics of the target corpus D. For example, if λ=0.5, it indicates that the SG model and the CB model are expected to reflect the characteristics of the target corpus D to the same extent. Similarly, if the retrofitted word vectors focus on the prediction from the inputted word to the context, a larger Δ may be assigned; and if the retrofitted word vectors focus on the prediction from the context to the word, a smaller λ may be assigned.

Step 650: The computing device retrofits the SG model and the CB model according to the combined excitation r:

$$\Theta_{SG} \leftarrow \Theta_{SG} + \gamma_1 \nabla_{\Theta_{SG}} r \quad (4)$$

$$\Theta_{CB} \leftarrow \Theta_{CB} + \gamma_2 \nabla_{\Theta_{CB}} r \quad (5)$$

where ∇ represents obtaining a gradient of r in the corresponding SG model or CB model; and $\gamma_1$ and $\gamma_2$ are decreasing weights in the policy gradient method, and values of the two may decrease in accordance with the training process, for example, decrease from 0.025. A magnitude of the decrease may depend on the scale of the target corpus D. For example, assuming that the target corpus D has 5 words, $\gamma_1$ and $\gamma_2$ may decrease by 0.025/5=0.005 for each iteration starting from 0.025. In addition, $\gamma_1$ and $\gamma_2$ may be set to different values, to obtain different model retrofitting speeds. For example, $\gamma_1 > \gamma_2$ means that the SG model is expected to have a higher retrofitting speed, whereas $\gamma_2 > \gamma_1$ means that the CB model is expected to have a higher retrofitting speed.

Step 660: The computing device repeats steps 610 to 650 on the entire corpus D.

With reference to FIG. 7, in the embodiment shown in FIG. 6, information exchange between the two agents is implemented by introducing an intermediate variable ($w_{SG}$). For any inputted word $w_t$ and its context C ( . . . $w_{t-2}$, $w_{t-1}$, $w_{t+1}$, $w_{t+2}$, . . . ), in this embodiment, the parameter of the SG model is used to obtain the intermediate variable $w_{SG}$ when the input is $w_t$, and then $w_{SG}$ is added to the context C to train the CB model, so that parameters of the original SG model and CB model can be retrofitted through the CB model and a similarity between $w_{SG}$ and the context, thereby optimizing the original SG model and CB model and finally improving the word vectors.

The intermediate variable $w_{SG}$ herein from the source corpus may be a word, or may be a non-text or non-word signal such as text classification information or sentiment tag information.

Using sentiment tag information as an example, it is assumed that the sentiment tag information of an inputted word in the source corpus is "commendatory", but the sentiment tag information of the inputted word in the target corpus D is "derogatory". For example, in terms of mobile phones, in the source corpus before large-screen mobile phones become popular, "small" may tend to express the advantage of compactness of mobile phones, so it tends to be "commendatory" in the source corpus. However, as time goes by, when the words "small" and "screen" appear together in the new target corpus, "small" tends to express "derogatory" sentiment tag information.

In the initial stage of the retrofitting, since the SG model is not trained by using the target corpus D, for the inputted word "small", its probability of outputting "derogatory" in the target corpus D is much less than a probability of outputting "commendatory" in the source corpus. Therefore, a result of the formula (1) is obviously less than zero. As the process of model retrofitting continues, the SG model is trained by using the target corpus D, and when "small" is used as the inputted word, a probability that the SG model outputs "derogatory" in the target corpus D tends to be close to the probability of outputting "commendatory" in the source corpus. Therefore, a result of the formula (1) also approaches zero, thereby enabling the retrofitted SG model to reflect the characteristics of the target corpus.

Similarly, in the initial stage of the retrofitting, since the CB model is not trained by using the target corpus D, after the context C of "small" in the target corpus and "commendatory" sentiment tag information are inputted into the CB model, a probability that the CB model outputs "small" is much less than 1. Therefore, a result of the formula (2) is obviously less than zero. As the process of model retrofitting continues, the CB model is trained by using the target corpus D, after the context C of "small" in the target corpus and "commendatory" sentiment tag information are inputted into the CB model, the probability that the CB model outputs "small" approaches 1. Therefore, a result of the formula (2) also approaches zero, thereby enabling the retrofitted CB model to reflect the characteristics of the target corpus.

In the embodiments of the present disclosure, the corpus unit from the target corpus is set to be an input of the first model by using the characteristic that the first model and the second model have opposite training directions, and an output of the first model is used as an input of the second model, to implement concatenation of the first model and the second model. Then, by obtaining the losses generated by the first model and the second model, during the process of training all corpus units of the target corpus, the parameters of the first model and the second model are continuously retrofitted based on the foregoing losses, so that retrofitting and training of both the first model and the second model are implemented based on only the target corpus.

Based on the word vector retrofitting method provided in the foregoing embodiment, incremental training of word vectors can be implemented, to avoid training the word vectors from scratch based on a large-scale training corpus, so that computing resources can be effectively saved. When the target corpus comes from a new domain, the retrofitted word vectors can adapt to the characteristics of the target corpus through training, thereby implementing migration and use of word vectors. This is more suitable for cold-start application scenarios.

In addition, based on the word vector retrofitting method provided in the foregoing embodiment, since the input includes the word vectors obtained through training, when there is only a small amount of target training corpus, the word vectors can still be effectively retrofitted in the foregoing embodiment, thereby achieving smooth learning and transition of existing word vectors based on a limited amount of corpus.

In addition, in the word vector retrofitting method provided in the foregoing embodiment, the framework of reinforcement learning is used, and various external (not limited to the word itself or knowledge derived from word corpus) signals can be added, so that in the method, various types of external knowledge can be actively captured in various usage scenarios, to fuse knowledge and word vectors.

The application scenarios of the embodiments of the present disclosure and how to implement the technical solutions of the embodiments of the present disclosure with reference to the application scenarios will be described below in detail.

In an application scenario of the present disclosure, enhancement training may be performed on the original word vectors based on the same corpus to obtain word vectors with enhanced performance. For example, based on the 300-dimensional news corpus provided by Google, the computing device may obtain an SG model and a CB model separately through training by using the Word2Vec tool, and then according to the embodiments of the present disclosure, still use the original 300-dimensional news corpus as an input, to obtain the SG model and the CB model of which parameters are retrofitted by performing the foregoing steps 610 to 660.

In an application scenario of the present disclosure, the original word vectors may be trained based on a newly added corpus from the same domain, to obtain word vectors that can reflect the characteristics of the newly added corpus. For example, based on the 300-dimensional news corpus provided by Google, the computing device may obtain an SG model and a CB model separately through training by using the Word2Vec tool, and in a case of hoping to retrofit the original model to adapt to some concentrated breaking news, according to the embodiments of the present disclosure, a target corpus D may be obtained, as an input, by performing preprocessing, for example, word segmentation, on the breaking news, to obtain the SG model and the CB model of which parameters are retrofitted by performing the foregoing steps 610 to 660.

In an application scenario of the present disclosure, the original word vectors from another domain may be trained based on a corpus from a new domain, to obtain word vectors that can reflect the characteristics of the corpus in the new domain. For example, for an SG model and a CB model obtained through training based on a corpus in the domain of news, in a case of hoping to migrate an original model for use in the medical domain, according to the embodiments of the present disclosure, the computing device may use a target corpus D in the medical domain as an input, to obtain the SG model and the CB model of which parameters are retrofitted by performing the foregoing steps 610 to 660.

In an application scenario of the present disclosure, sentiment tags may also be introduced to retrofit original word vectors, thereby obtaining word vectors that can reflect the characteristics of a corpus in a new domain. For example, as the technology progresses and the time goes, sentiment tag information of some words in the source corpus has changed in the target corpus D, to reflect the characteristics of the words in the target corpus D, the computing device may use the target corpus D as an input, to obtain the SG model and the CB model of which parameters are retrofitted by performing the foregoing steps 610 to 660.

Based on the application scenarios described above, it can be seen that the word vector retrofitting method provided in the foregoing embodiment may be used in all application scenarios related to natural language and required processing technologies. For example, one application may include generating or retrofitting word vectors by using the model provided in the present disclosure, and delivering the generated vectors for application to subsequent natural language processing tasks. For example, the generated word vectors may be used in word segmentation and part-of-speech tagging systems, to improve accuracy of word segmentation and part-of-speech tagging, thereby improving a subsequent processing capability. For another example, in searches and search-related scenarios, it is often necessary to sort obtained search results, and a semantic similarity of each result to a query statement often needs to be calculated for the sorted result. Such a similarity may be measured by performing similarity calculation on word vectors. Therefore, an effect of such a semantic similarity calculation method greatly depends on quality of vectors.

In particular, for a cold-start situation, high-quality cross-domain word vectors may be obtained by using the method provided in the present disclosure. Therefore, the method described in the present disclosure may be applied to various natural language processing products that need to be used across domains. For example, in the natural language processing for medical care (such as case analysis and keyword extraction), ordinary word vectors may be trained by using large-scale news text, and then the word vectors may be retrofitted based on a few amount of data in the medical domain by using the method provided in the present disclosure, so that the obtained word vectors have accuracy of word vectors obtained from large-scale data and also include domain knowledge in the medical domain.

The following is an apparatus embodiment of the present disclosure, which may be used for executing the embodiments of the word vector retrofitting method of the present disclosure. For details that are not disclosed in this apparatus embodiment of the present disclosure, refer to the embodiment of the word vector retrofitting method of the present disclosure.

Figure 8:
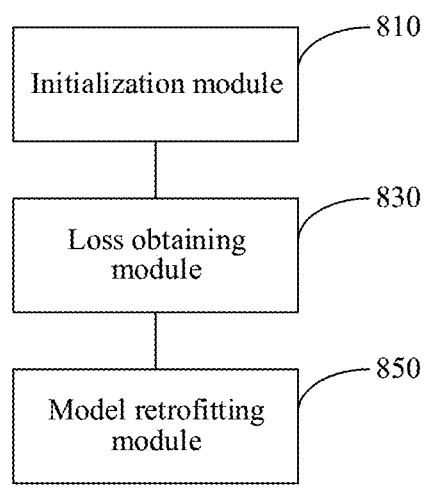
FIG. 8 is a block diagram of a word vector retrofitting apparatus according to an exemplary embodiment.

FIG. 8 is a block diagram of a word vector retrofitting apparatus according to an exemplary embodiment. The word vector retrofitting apparatus, as shown in FIG. 8, includes, but is not limited to: an initialization module 810, a loss obtaining module 830, and a model retrofitting module 850.

The initialization module 810 is configured to obtain a first model and a second model that are generated when original word vectors are trained, the first model being configured to predict a context according to an inputted word, and the second model being configured to predict a target word according to a context.

The loss obtaining module 830 is configured to input a corpus unit from a target corpus into the first model, input the output of the first model into the second model, and obtain losses generated by the first model and the second model when the second model outputs the corpus unit.

The model retrofitting module 850 is configured to retrofit the first model and the second model according to the losses obtained by the loss obtaining module 830.

In one embodiment, the initialization module 810 may learn, without supervision, the first model and the second model by using a large-scale training corpus. In another embodiment, the initialization module 810 may also directly obtain and use open-source word vectors as an input for subsequent retrofitting steps. The foregoing first model may be, for example, the SG model, and the second model may be, for example, the CB model. The embodiments of the present disclosure are not limited thereto.

In one embodiment, the model retrofitting module 850 is configured to iteratively retrofit the first model and the second model until the losses obtained by the loss obtaining module 830 meet a preset convergence condition.

In the embodiments of the present disclosure, the corpus unit from the target corpus is set to be an input of the first model by using the characteristic that the first model and the second model have opposite training directions, and an output of the first model is used as an input of the second model, to implement concatenation of the first model and the second model. Then, by obtaining the losses generated by the first model and the second model, during the process of training all corpus units of the target corpus, the parameters of the first model and the second model are continuously retrofitted based on the foregoing losses, so that retrofitting and training of both the first model and the second model are implemented based on only the target corpus.

Based on the word vector retrofitting apparatus provided in the foregoing embodiment, incremental training of word vectors can be implemented, to avoid training the word vectors from scratch based on a large-scale training corpus, so that computing resources can be effectively saved. When the target corpus comes from a new domain, the retrofitted word vectors can adapt to the characteristics of the target corpus through training, thereby implementing migration and use of word vectors.

Figure 9:
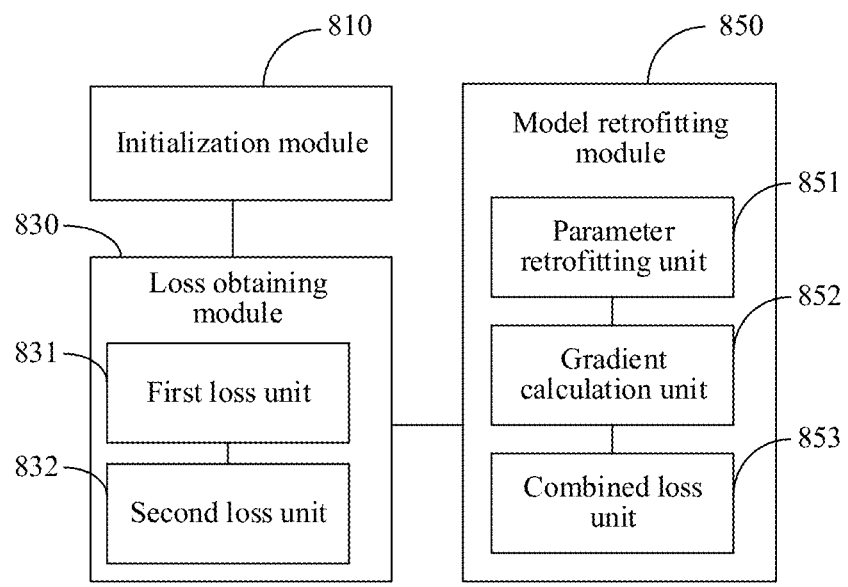
FIG. 9 is a block diagram of a word vector retrofitting apparatus according to another exemplary embodiment.

FIG. 9 is a block diagram of a word vector retrofitting apparatus according to another exemplary embodiment. As shown in FIG. 9, in the word vector retrofitting apparatus based on the embodiment shown in FIG. 8, the loss obtaining module 830 includes, but is not limited to, a first loss unit 831 and a second loss unit 832; and the model retrofitting module 850, includes but is not limited to: a combined loss unit 851, a gradient calculation unit 852, and a parameter retrofitting unit 853.

The first loss unit 831 is configured to obtain, for the corpus unit and a corpus context of the corpus unit in the target corpus, a first loss when the first model outputs the corpus context and a preset intermediate variable. In one embodiment, the first loss unit 831 is configured to obtain an output probability of the intermediate word when the corpus unit is inputted into the first model; obtain an output probability of the corpus context when the corpus unit is inputted into the first model; and obtain a difference between the output probability of the intermediate word and the output probability of the corpus context, to determine the first loss.

The second loss unit 832 is configured to obtain a second loss when the corpus unit is outputted through the second model according to the corpus context and the intermediate variable. In one embodiment, the second loss unit 832 is configured to add the intermediate word to the corpus context to obtain a retrofitted context; and obtain an output probability of the corpus unit when the retrofitted context is inputted into the second model, to obtain the second loss.

The combined loss unit 851 is configured to obtain a combined loss based on the first loss generated by the first model and the second loss generated by the second model.

The gradient calculation unit 852 is configured to obtain a first gradient of the combined loss in the first model and a second gradient of the combined loss in the second model.

The parameter retrofitting unit 853 is configured to retrofit a parameter of the first model and a parameter of the second model based on the first gradient and the second gradient respectively.

In one embodiment, the preset intermediate variable may be an intermediate word from the source corpus. The intermediate word is added to the context of the foregoing corpus unit to train the second model, a first loss when the first model outputs the context and the intermediate word is obtained, and a second loss when the foregoing corpus unit is outputted through the second model according to the context and the intermediate word is obtained, so that a combined loss of the two models is obtained based on the first loss and the second loss. The source corpus may be different from the target corpus, or the source corpus may include the target corpus.

In another embodiment, the foregoing preset intermediate variable may also include other types of corpus units, for example, non-text or non-word corpus signals, including text classification information and sentiment tag information.

In one embodiment, the parameter retrofitting unit 853 is configured to retrofit the parameter of the first model based on the first gradient and a first weight corresponding to the first gradient; and retrofit the parameter of the second model based on the second gradient and a second weight corresponding to the second gradient. The first weight and the second weight are decreased in the process of retrofitting the first model and the second model based on each corpus unit from the target corpus.

In the embodiments of the present disclosure, the corpus unit from the target corpus is set to be an input of the first model by using the characteristic that the first model and the second model have opposite training directions, and an output of the first model is used as an input of the second model, to implement concatenation of the first model and the second model. Then, by obtaining the losses generated by the first model and the second model, during the process of training all corpus units of the target corpus, the parameters of the first model and the second model are continuously retrofitted based on the foregoing losses, so that retrofitting and training of both the first model and the second model is implemented based on only the target corpus.

Based on the word vector retrofitting apparatus provided in the foregoing embodiment, incremental training of word vectors can be implemented, to avoid training the word vectors from scratch based on a large-scale training corpus, so that computing resources can be effectively saved. When the target corpus comes from a new domain, the retrofitted word vectors can adapt to the characteristics of the target corpus through training, thereby implementing migration and use of word vectors.

In addition, based on the word vector retrofitting apparatus provided in the foregoing embodiment, since the input includes the word vectors obtained through training, when there is only a small amount of target training corpus, the word vectors can still be effectively retrofitted in the foregoing embodiment, thereby achieving smooth learning and transition of existing word vectors based on a limited amount of corpus.

In the word vector retrofitting apparatus provided in the foregoing embodiment, the framework of reinforcement learning is used, and various external (not limited to the word itself or knowledge derived from word corpus) signals can be added, so that the apparatus can actively capture various types of external knowledge in various usage scenarios, to fuse knowledge and word vectors.

Figure 10:
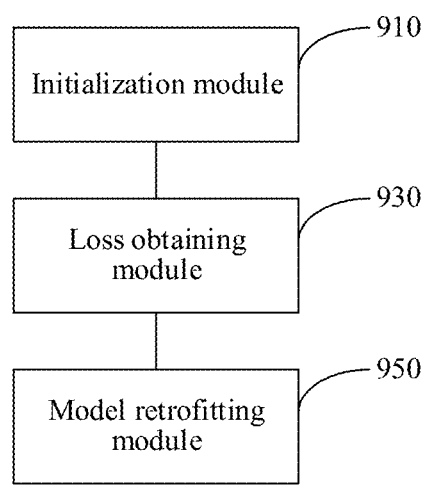
FIG. 10 is a block diagram of a word vector retrofitting apparatus according to an exemplary embodiment.

FIG. 10 is a block diagram of a word vector retrofitting apparatus according to an exemplary embodiment. The word vector retrofitting apparatus, as shown in FIG. 10, includes but is not limited to: an initialization module 910, a loss obtaining module 930, and a model retrofitting module 950.

The initialization module 910 is configured to obtain a first model and a second model that are generated when original word vectors are trained, the first model being configured to predict a context according to an inputted word, and the second model being configured to predict a target word according to a context.

The loss obtaining module 930 is configured to input a corpus unit from a target corpus into the first model, input the output of the first model into the second model, and obtain losses generated by the first model and the second model when the second model outputs the corpus unit.

The model retrofitting module 950 is configured to retrofit the first model and the second model according to the losses.

In one embodiment, the model retrofitting module 950 is configured to retrofit the first model, to make an output probability of an intermediate word from a source corpus approach to be equal to an output probability of a context of the target corpus; and retrofit the second model, to make an output probability of the target corpus close to 1.

In one embodiment, the loss obtaining module 930 is configured to obtain a difference between the output probability of the intermediate word and an average output probability of the context of the target corpus, to obtain a loss generated by the first model; add the intermediate word to the context of the target corpus to retrofit the context; and obtain an output probability of the target corpus when the retrofitted context is inputted into the second model, to obtain a loss generated by the second model.

In one embodiment, the initialization module 910 is configured to obtain an SG model and a CB model that are trained based on the source corpus, and the target corpus.

Correspondingly, in this embodiment, the loss obtaining module 930 is configured to calculate the loss generated by the first model according to the following formula:

$$r_{SG} = \frac{1}{|C|} \sum_{w_j \in C} \log p(w_j | w_t; \Theta_{SG}) - \log p(w_{SG} | w_t; \Theta_{SG})$$

$|C|$ representing a size of a context; $w_j$ representing each word in the context C; $\Theta_{SG}$ representing a parameter of an SG model; $p(w_j|w_t; \Theta_{SG})$ representing a probability that a current SG model outputs each word $w_j$ when an inputted word $w_t$ is given; and $p(w_{SG}|w_t; \Theta_{SG})$ representing a probability that a current SG model outputs $w_{SG}$ when the inputted word $w_t$ is given; and add $w_{SG}$ to the context C, and calculate, according to the following formula, a loss generated by the second model when $w_t$ is outputted through a CB model according to the retrofitted context:

$$r_{CB} = \log p(w_t | C + w_{SG}; \Theta_{CB})$$

$C+w_{SG}$ represents a new context formed after $w_{SG}$ is added to C, and $p(w_t|C+w_{SG}; \Theta_{CB})$ represents a probability that a current CB model outputs $w_t$ when the new context is inputted.

Correspondingly, in this embodiment, the model retrofitting module 950 is configured to combine $r_{SG}$ and $r_{CB}$, according to the following formula, to obtain a combined excitation r:

$$r = \lambda r_{SG} + (1-\lambda) r_{CB}$$

λ being a weight coefficient; and
retrofit the SG model and the CB model according to the combined excitation r and the following formulas:

$$\Theta_{SG} \leftarrow \Theta_{SG} + \gamma_1 \nabla_{\Theta_{SG}} r$$

$$\Theta_{CB} \leftarrow \Theta_{CB} + \gamma_2 \nabla_{\Theta_{CB}} r$$

∇ representing obtaining a gradient of r in the corresponding SG model or CB model; and $\gamma_1$ and $\gamma_2$ being decreasing weights.

In the embodiments of the present disclosure, the corpus unit from the target corpus is set to be an input of the first model by using the characteristic that the first model and the second model have opposite training directions, and an output of the first model is used as an input of the second model, to implement concatenation of the first model and the second model. Then, by obtaining the losses generated by the first model and the second model, during the process of training all corpus units of the target corpus, the parameters of the first model and the second model are continuously retrofitted based on the foregoing losses, so that retrofitting and training of both the first model and the second model are implemented based on only the target corpus.

Based on the word vector retrofitting apparatus provided in the foregoing embodiment, incremental training of word vectors can be implemented, to avoid training the word vectors from scratch based on a large-scale training corpus, so that computing resources can be effectively saved. When the target corpus comes from a new domain, the retrofitted word vectors can adapt to the characteristics of the target corpus through training, thereby implementing migration and use of word vectors.

The specific manners of performing operations by the various modules of the apparatuses in the foregoing embodiments are described in detail in the embodiments related to the methods, and are not further described herein in detail.

Although several modules or units of the device for action execution are mentioned in the specific descriptions above, this division is not mandatory. In fact, according to the embodiments of the present disclosure, the features and functions of the two or more modules or units described above may be embodied in one module or unit. Conversely, the features and functions of one module or unit described above may be further divided and embodied in a plurality of modules or units. The parts displayed as modules or units may or may not be physical units, that is, may be located in one position, or may be distributed on multiple network units. The objective of the solution of the present disclosure may be implemented by selecting some or all of the modules according to actual needs.

It is to be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A word vector retrofitting method, comprising:
obtaining, by a computing device, a first model and a second model trained with word vectors, the first model being configured to predict a context according to an inputted word, and the second model being configured to predict a target word according to a context;
inputting a corpus unit from a target corpus into the first model, inputting an output of the first model into the second model, and determining losses generated by the first model and the second model when the second model outputs the corpus unit; and
retrofitting the first model and the second model according to the losses, comprising:
determining a first loss of the first model according to a difference between an output probability of a preset intermediate variable from a source corpus outputted by the first model and an output probability of a context of the corpus unit outputted by the first model, wherein the preset intermediate variable corresponds to the corpus unit inputted into the first model;
determining a second loss of the second model according to an output probability of an updated context outputted by the second model, the updated context being determined based on the context of the corpus unit and the output of the first model; and
adjusting a parameter of the first model and a parameter of the second model according to the first loss and the second loss.

2. The method according to claim 1, wherein the preset intermediate variable comprises an intermediate word, and determining the first loss comprises:
obtaining an output probability of the intermediate word when the corpus unit is inputted into the first model;
obtaining an output probability of the context when the corpus unit is inputted into the first model; and
obtaining a difference between the output probability of the intermediate word and the output probability of the context, to determine the first loss.

3. The method according to claim 1, wherein the preset intermediate variable comprises an intermediate word, and the second loss is obtained by:
adding the intermediate word to the context to obtain the updated context; and
obtaining an output probability of the corpus unit when the updated context is inputted into the second model, to determine the second loss.

4. The method according to claim 1, wherein the retrofitting the first model and the second model according to the losses comprises:
determining a combined loss based on the first loss generated by the first model and the second loss generated by the second model;
determining a first gradient of the combined loss in the first model and a second gradient of the combined loss in the second model; and
retrofitting a parameter of the first model based on the first gradient, and retrofitting a parameter of the second model based on the second gradient.

5. The method according to claim 4, wherein the retrofitting a parameter of the first model based on the first gradient, and retrofitting a parameter of the second model based on the second gradient comprises:
retrofitting the parameter of the first model based on the first gradient and a first weight assigned to the first gradient; and
retrofitting the parameter of the second model based on the second gradient and a second weight assigned to the second gradient, the first weight and the second weight being decreased in the process of retrofitting the first model and the second model based on each corpus unit from the target corpus.

6. The method according to claim 1, wherein the first model includes a word-to-context skip-gram (SG) model and the second model includes a context-to-word Continuous Bag-of-words (CB) model.

7. An electronic device, comprising: a processor; and a memory, the memory storing a computer-readable instructions, the computer-readable instruction, when executed by the processor to perform:
obtaining a first model and a second model trained with word vectors, the first model being configured to predict a context according to an inputted word, and the second model being configured to predict a target word according to a context;
inputting a corpus unit from a target corpus into the first model, inputting an output of the first model into the second model, and determining losses generated by the first model and the second model when the second model outputs the corpus unit; and
retrofitting the first model and the second model according to the losses, comprising:
determining a first loss of the first model according to a difference between an output probability of a preset intermediate variable from a source corpus outputted by the first model and an output probability of a context of the corpus unit outputted by the first model, wherein the preset intermediate variable corresponds to the corpus unit inputted into the first model;
determining a second loss of the second model according to an output probability of an updated context outputted by the second model, the updated context being determined based on the context of the corpus unit and the output of the first model; and
adjusting a parameter of the first model and a parameter of the second model according to the first loss and the second loss.

8. The electronic device according to claim 7, wherein the preset intermediate variable comprises an intermediate word, and determining the first loss comprises:
obtaining an output probability of the intermediate word when the corpus unit is inputted into the first model;
obtaining an output probability of the context when the corpus unit is inputted into the first model; and
obtaining a difference between the output probability of the intermediate word and the output probability of the context, to determine the first loss.

9. The electronic device according to claim 7, wherein the preset intermediate variable comprises an intermediate word, and the second loss is obtained by:
adding the intermediate word to the context to obtain the updated context; and
obtaining an output probability of the corpus unit when the updated context is inputted into the second model, to determine the second loss.

10. The electronic device according to claim 7, wherein the retrofitting the first model and the second model according to the losses comprises:
determining a combined loss based on the first loss generated by the first model and the second loss generated by the second model;

determining a first gradient of the combined loss in the first model and a second gradient of the combined loss in the second model; and retrofitting a parameter of the first model based on the first gradient, and retrofitting a parameter of the second model based on the second gradient.

11. The electronic device according to claim 10, wherein the retrofitting a parameter of the first model based on the first gradient, and retrofitting a parameter of the second model based on the second gradient comprises:

retrofitting the parameter of the first model based on the first gradient and a first weight assigned to the first gradient; and retrofitting the parameter of the second model based on the second gradient and a second weight assigned to the second gradient, the first weight and the second weight being decreased in the process of retrofitting the first model and the second model based on each corpus unit from the target corpus.

12. The electronic device according to claim 7, wherein the first model includes a word-to-context SG model and the second model includes a context-to-word CB model.

13. A non-transitory computer-readable storage medium storing computer program instructions executable by at least one processor to perform:

obtaining a first model and a second model trained with word vectors, the first model being configured to predict a context according to an inputted word, and the second model being configured to predict a target word according to a context;

inputting a corpus unit from a target corpus into the first model, inputting an output of the first model into the second model, and determining losses generated by the first model and the second model when the second model outputs the corpus unit; and retrofitting the first model and the second model according to the losses, comprising:

determining a first loss of the first model according to a difference between an output probability of a preset intermediate variable from a source corpus outputted by the first model and an output probability of a context of the corpus unit outputted by the first model, wherein the preset intermediate variable corresponds to the corpus unit inputted into the first model;

determining a second loss of the second model according to an output probability of an updated context outputted by the second model, the updated context being determined based on the context of the corpus unit and the output of the first model; and adjusting a parameter of the first model and a parameter of the second model according to the first loss and the second loss.

14. The non-transitory computer-readable storage medium according to claim 13, wherein the preset intermediate variable comprises an intermediate word, and determining the first loss comprises:

obtaining an output probability of the intermediate word when the corpus unit is inputted into the first model;

obtaining an output probability of the context when the corpus unit is inputted into the first model; and obtaining a difference between the output probability of the intermediate word and the output probability of the context, to determine the first loss.

15. The non-transitory computer-readable storage medium according to claim 13, wherein the preset intermediate variable comprises an intermediate word, and the second loss is obtained by:

adding the intermediate word to the context to obtain the updated context; and obtaining an output probability of the corpus unit when the updated context is inputted into the second model, to determine the second loss.

16. The non-transitory computer-readable storage medium according to claim 13, wherein the retrofitting the first model and the second model according to the losses comprises:

determining a combined loss based on the first loss generated by the first model and the second loss generated by the second model;

determining a first gradient of the combined loss in the first model and a second gradient of the combined loss in the second model; and retrofitting a parameter of the first model based on the first gradient, and retrofitting a parameter of the second model based on the second gradient.

17. The non-transitory computer-readable storage medium according to claim 16, wherein the retrofitting a parameter of the first model based on the first gradient, and retrofitting a parameter of the second model based on the second gradient comprises:

retrofitting the parameter of the first model based on the first gradient and a first weight assigned to the first gradient; and retrofitting the parameter of the second model based on the second gradient and a second weight assigned to the second gradient, the first weight and the second weight being decreased in the process of retrofitting the first model and the second model based on each corpus unit from the target corpus.

18. The non-transitory computer-readable storage medium according to claim 13, wherein the first model includes a word-to-context skip-gram (SG) model and the second model includes a context-to-word Continuous Bag-of-words (CB) model.

* * * * *